US006907560B2

(12) United States Patent
Gagnon

(10) Patent No.: US 6,907,560 B2
(45) Date of Patent: Jun. 14, 2005

(54) FORWARD ERROR CORRECTION (FEC) ON A LINK BETWEEN ICS

(75) Inventor: Ronald J. Gagnon, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 540 days.

(21) Appl. No.: 09/822,190

(22) Filed: Apr. 2, 2001

(65) Prior Publication Data

US 2002/0178420 A1 Nov. 28, 2002

(51) Int. Cl.⁷ .......................... H03M 13/00; G06F 15/00

(52) U.S. Cl. ........................................ 714/776; 712/32

(58) Field of Search ................................ 714/724, 726, 714/727, 733, 734, 746, 751, 752, 768, 774, 776, 782, 753; 712/32–35

(56) References Cited

U.S. PATENT DOCUMENTS

| 4,413,340 A | | 11/1983 | Odaka et al. |
| 5,040,179 A | | 8/1991 | Chen |
| 5,517,637 A | * | 5/1996 | Bruce et al. ................... 703/15 |
| 5,872,799 A | | 2/1999 | Lee et al. |
| 5,928,376 A | | 7/1999 | Dettmar et al. |
| 6,061,825 A | * | 5/2000 | Wolf .......................... 714/776 |
| 6,657,967 B1 | * | 12/2003 | Fujisawa et al. ............ 370/242 |

FOREIGN PATENT DOCUMENTS

| EP | 0 675 620 A1 | 10/1995 |
| EP | 0 974 902 A1 | 1/2000 |
| EP | 0 989 681 A2 | 3/2000 |
| EP | 1 032 150 A2 | 8/2000 |
| WO | WO 99/17198 | 4/1999 |

OTHER PUBLICATIONS

Notification Concerning Informal Communications with the Applicant PCT/CA02/00454 and copy of PCT written opinion dated Jul. 29, 2003.
International Preliminary Examination Report, PCT/CA02/00454, Jan. 23, 2004.
Anonymous: "Agere Systems Introduces Industry's First Single–Chip, True Protocol–Independant Data Transport Device Offering Error Correction for OC–192 Optical Networks" Internet Article, On Line, Mar. 19, 2001, XP002230982 URL://http: www.agere.com/news/press2001/031901b.html, Feb. 12, 2003.
Anonymous: "TFEC0410G 2.5/10 Gbits/s Optical Networking Interface with Strong/Weak FEC and Digital Wrapper" Internet Article, on Line, Mar. 2001 URL:http://www.agere-.com/long_haul_backbone/docs/OT01232.pdf, Feb. 12, 2003.
European Search Report PCT/CA02/00454; Apr. 2, 2002.

* cited by examiner

Primary Examiner—Albert Decady
Assistant Examiner—Cynthia Britt
(74) Attorney, Agent, or Firm—Jeffrey M. Measures; Borden Ladner Gervais LLP

(57) ABSTRACT

An apparatus suitable for generating a signal for transmission over a link between two ICs is provided. The apparatus receives an input signal comprising payload data to be transmitted and processes the payload data in the input signal to derive forward error correction data. An output signal is generated, the output signal comprising the payload data received in the input signal and the generated forward error correction data. The output signal is released for transmission over the link between two ICs. The link between two ICs may include for example a backplane or a link between two ICs on a same circuit pack. The use of forward error correction data in a signal carried over a conducting medium suitable for carrying electrical signals is also provided.

17 Claims, 8 Drawing Sheets

FORWARD ERROR CORRECTION (FEC) ON A LINK BETWEEN ICS

FIELD OF THE INVENTION

The present invention relates generally to high-speed transport networks and, more particularly, to the transmission of signals on backplanes and between ICs on a same circuit pack using error correction techniques for reducing bit error rates at high transmission speeds.

BACKGROUND

At relatively low speeds of data transportation, roughly 100 Mb/sec, error rates between two different ICs on a circuit pack or over a backplane are generally unmeasurable. In other words, they are close to zero. As speeds of data transportation over backplanes and between ICs increase to 2.5 Gb/s and above, the likelihood of having transmission errors increases as well. These errors may be due to effects such as inter-symbol interference, attenuation, couplings between links on the ICs, noise coupling from digital to analog section of an IC, simultaneous switching noise in ICs, signal distortion in connectors or backplane, and process distortion, among others. Consequently, it becomes difficult to get sufficiently low errors rates.

Consequently, there is a need in the industry for reducing bit error rates at high transmission speeds over backplanes and between ICs.

SUMMARY OF THE INVENTION

In accordance with a broad aspect, the invention provides the use of forward error correction data in a signal carried over a link between two ICs (Integrated Circuits). In a non-limiting example, the link between two ICs is between two ICs on a same circuit pack. Alternatively, the link between two ICs includes a backplane.

In a specific example, the link between two ICs is a medium suitable for the propagation of electrical signals.

In accordance with another broad aspect, the invention provides a method for generating a signal for transmission over a link between two ICs. An input signal is received, the input signal comprising payload data to be transmitted over the link between two ICs. The data in the input signal is processed to derive forward error correction data at least in part on the basis of the payload data in the input signal. An output signal comprising the payload data received in the input signal and the forward error correction data is then generated and released for transmission over the link between two ICs.

In a specific example, the link between two ICs can include a backplane or a link between two ICs on a same circuit pack.

In accordance with another broad aspect, the invention provides an apparatus for implementing the above-described method.

In accordance with another broad aspect, the invention provides a signal carried over a link between two ICs. The signal includes a sequence of frames, each frame including a plurality of sequential blocks, each block being characterized by a compound data structure suitable for carrying payload data and overhead information. The compound data structure is derived by bit-multiplexing a set of N primary data structures. Each primary data structure comprises a first portion and a second portion, the first portion including payload data, the second portion including forward error correction data derived from the data elements in the first portion.

In a non-limiting specific example of implementation, the signal has a rate of about 2.5 Gb/s and comprises a sequence of frames, each frame includes 1 framing pattern and 66 sequential blocks. Each block being characterized by a compound data structure, where the compound data structure is derived by bit-multiplexing a set of 4 primary data structures. In other words N=4. The skilled person in the art will readily appreciate that N can take on a plurality of non-negative integer number values greater than 0. In a non-limiting example, N is selected from the set consisting of {1, 2, 3, . . . , 14, 15, 16}. Each primary data structure includes about 1176 bits, wherein at least part of the first 1164 bits of each primary data structure includes payload data, and 12 bits include forward error correction.

It will be readily appreciated that any suitable coding may be applied to the payload data in a given block to derive the forward error correction data for that given block. In a very specific non-limiting example, the forward error correction data in a given primary data structure are derived by applying BCH-1 coding on at least part of the payload data of the given primary data structure. The skilled person in the art will readily appreciate that methods, other than BCH-1 coding, may be used in connection with FEC without detracting from the spirit of the invention.

In accordance with another broad aspect, the invention provides a method and an apparatus for generating the above-described signal for transmission over a link between two ICs. The link between two ICs may include a backplane or a link between two ICS on a same circuit pack.

In accordance with another broad aspect, the invention provides an IC suitable for processing a signal of the type described above. Processing a signal comprises plurality of signal processing functions including but not limited to signal generation and signal information extraction.

Other aspects and features of the present invention will become apparent to those ordinarily skilled in the art upon review of the following description of specific embodiments of the invention in conjunction with the accompanying figures.

Figure 1:
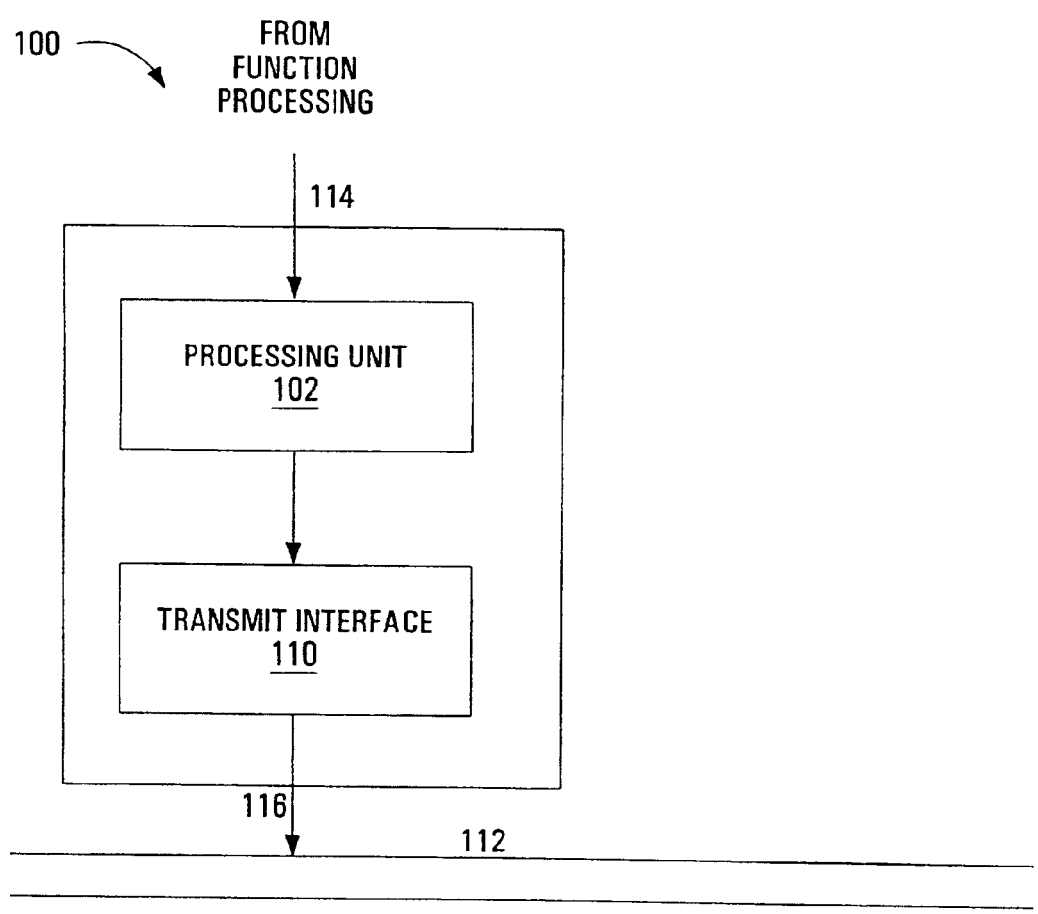
FIG. 1 is a specific example of an apparatus for generating a signal constructed in accordance with a specific example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

The specific example of implementation described pertains to apparatuses for exchanging signals over a link between two ICs, the link being capable of propagating electrical signals.

FIG. 1 shows an apparatus 100 suitable for transmitting signals over a link between two ICs 112. In a non-limiting example, the link between two ICs 112 includes a backplane portion. Alternatively, link 112 is a link between two ICs on a same circuit pack. As depicted, the apparatus 100 comprises an input 114, an output 116, a processing unit 102, and a transmit interface 110.

The input 114 is for receiving payload data from one or more functional processing units. The payload data may be in any suitable format. The functional processing units may reside on the same physical structure as apparatus 100 or on a different physical structure. In a non-limiting example, the physical structure is an electronic circuit such as an ASIC (Application Specific Integrated Circuit). The specific functional processing units from which the data originates does not form part of the invention and as such will not be described.

The processing unit 102 processes the payload data in the input signal received at input 114 to derive associated forward error correction data. The processing unit then generates an output signal comprising the payload data and the generated forward error correction data.

The interface 110 receives the output signal generated by the processing unit 102 and performs any necessary processing for transmitting the output signal over the link between two ICs 112. This may include for example multiplexing from a parallel bus to a serial bit stream.

The functionality of processing unit 102 will now be described in accordance with a specific example of implementation with reference to FIG. 2 of the drawings.

Figure 2:
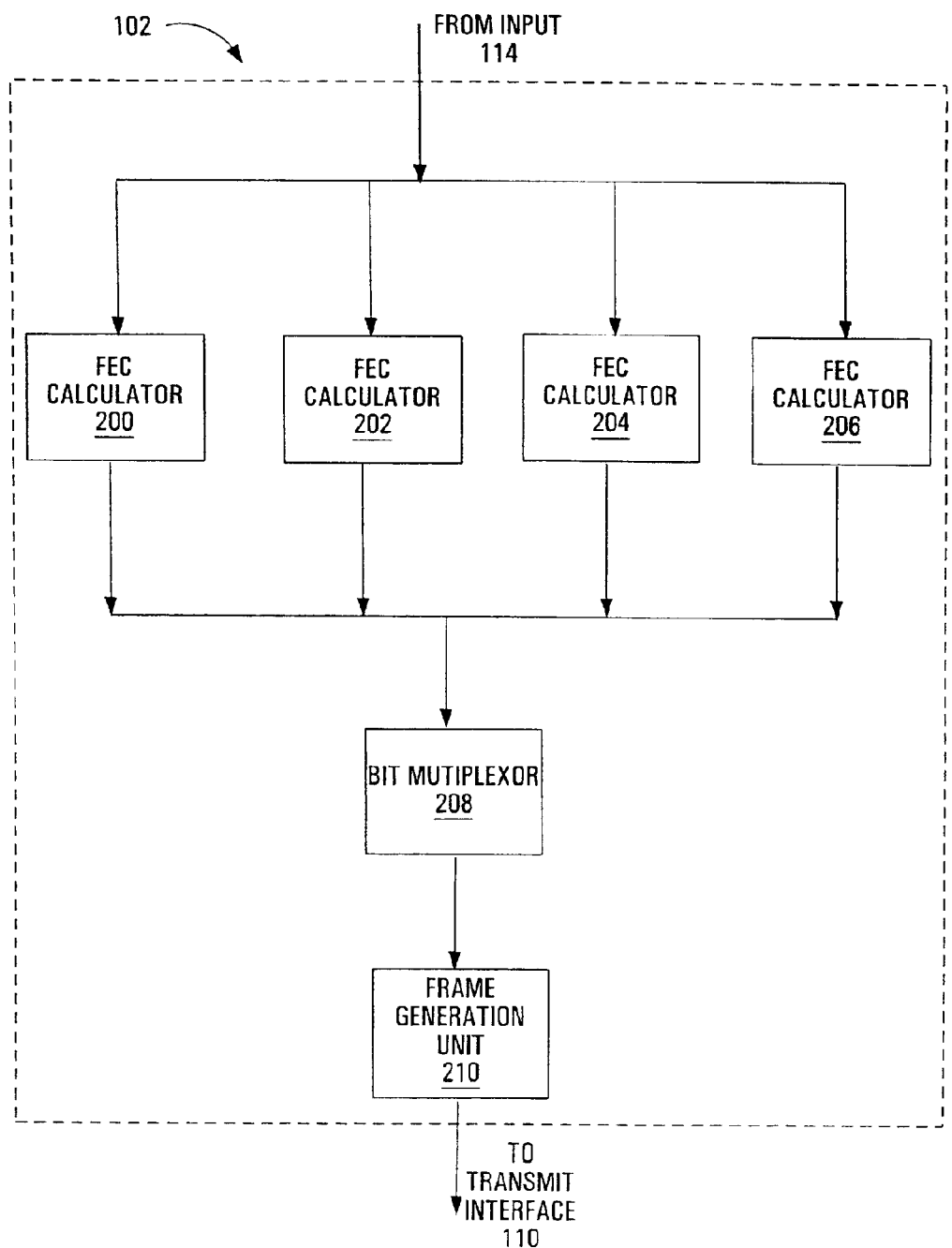
FIG. 2 is a detailed block diagram of the processing unit in the apparatus of FIG. 1.

In accordance with a specific implementation, as depicted in FIG. 2, the processing unit 102 includes a set of N forward error correction (FEC) calculator units 200 202 204 206, a bit-multiplexor 208 and a framing pattern generator 210.

In a typical interaction, a signal including payload is received by processing unit 102 from input 114. The skilled person in the art will readily appreciate that different types of payload data may be received from port 114 without detracting from the spirit of the invention.

Figure 3:
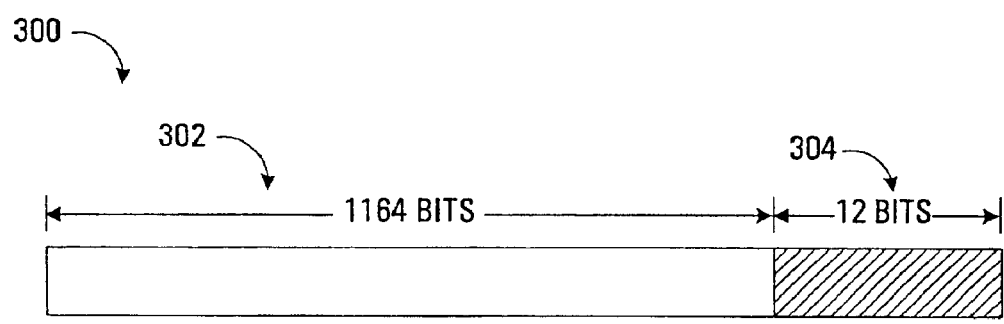
FIG. 3 depicts a primary data structure in accordance with a specific example of implementation of the invention.

The payload data may be comprised of N channels or of a single channel. This specific example considers the case where the input signal is comprises of N channels. Each of the N channels is directed to a respective FEC calculator unit 200 202 204 206. At each FEC calculator unit, forward error correction data is computed on the basis of payload data. Many different FEC schemes may be used here. In a very specific example of implementation, the FEC scheme is a 1rst order Binary BCH code. Advantageously, this FEC scheme allows the FEC decoder at the receiver to correct up to 1 error per primary data structure. Each FEC calculator unit then generates a primary data structure. Each primary data structure comprises a first portion and a second portion, the first portion including payload data, the second portion including forward error correction data derived from the data elements in the first portion. A representation of a specific implementation of the primary data structure is depicted in FIG. 3. In the specific implementation depicted in FIG. 3, each primary data structure includes 1176 bits. In the primary data structure 300, the payload data 302 occupies bits 1–1164, the forward error correction data 304 occupies 12 bits namely bits 1165–1176.

In this fashion a set of N primary data structures is generated by the set of N FEC calculator units. In a variant, the N primary data structures may be generated serially by taking N sequential portions of the payload data received at input 114 on a same channel. In this variant, a single FEC calculator unit may be used. The N primary data structures are then transmitted to the bit-multiplexor unit 208.

Figure 4:
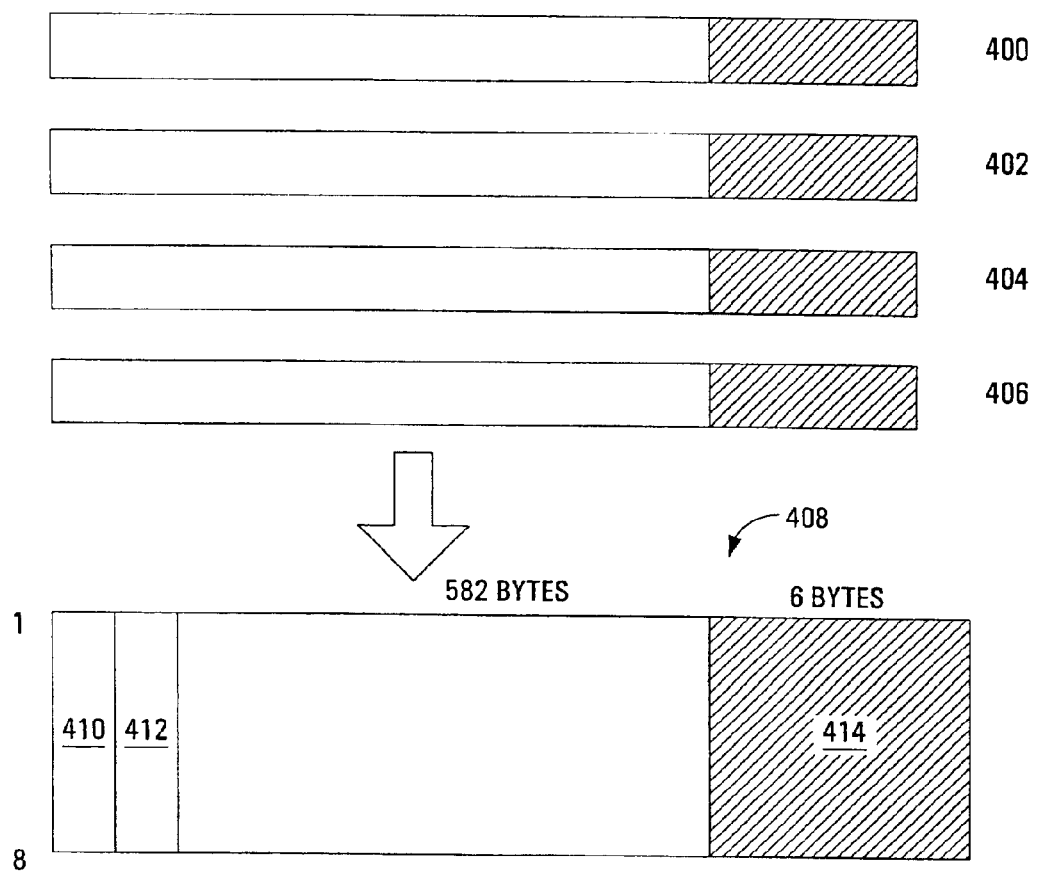
FIG. 4 shows a compound data structure in accordance with a specific example of implementation of the invention.

The bit-multiplexor unit 208 bit-multiplexes the set of N primary data structures to generate a compound data structure. A representation of a specific implementation of the primary data structure is depicted in FIG. 4. The compound data structure 408 shown in FIG. 4 is derived by bit-multiplexing a set of N=4 primary data structures 400 402 404 and 406 similar in format to primary data structure 300. The skilled person in the art will readily appreciate that N can take on a plurality of non-negative integer number values greater than 0. In a non-limiting example, N is selected from the set consisting of $\{1, 2, 3, \ldots, 14, 15, 16\}$. As shown, the compound data structure comprises payload data and forward error correction data. More specifically, the compound data structure comprises 582 bytes (582 8-bit words) of payload data and 6 bytes of forward error correction data 414. The manner in which the bit-multiplexor multiplexes the primary data structure may vary widely from one implementation to the other.

The table below shows a non-limiting specific implementation of the bit-multiplexing mapping.

| Compound data structure Bit numbering | Bits mapped from the 4 channels |
|---|---|
| Bit #1 | bit 1, 3 . . . 1175 of primary data structure #1 |
| Bit #2 | bit 1, 3, . . . 1175 of primary data structure #2 |
| Bit #3 | bit 1, 3, . . . 1175 of primary data structure #3 |
| Bit #4 | bit 1, 3, . . . 1175 of primary data structure #4 |
| Bit #5 | bit 2, 4, . . . 1176 of primary data structure #1 |
| Bit #6 | bit 2, 4, . . . 1176 of primary data structure #2 |
| Bit #7 | bit 2, 4, . . . 1176 of primary data structure #3 |
| Bit #8 | bit 2, 4, . . . 1176 of primary data structure #4 |

On the basis of the above table, word #1 identified as element 410 in FIG. 4, comprises of bits #1 and #2 of the primary data structures 400 402 404 and 406, while word #2 identified as element 412 in FIG. 4, comprises of bits #3 and #4 of the same primary data structures. Advantageously, bit multiplexing allows a burst of bit errors to be spread amongst the interleaved primary data structures, therefore increasing the likelihood that a given primary data structure will have no more than 1 bit error.

The compound data structure is then transmitted to the frame generation unit 210. The frame generation unit 210 generates a sequence of frames at least in part on the basis of the compound data structures received from the bit-multiplexor unit 208. Each frame includes a framing pattern and a plurality of sequential blocks, each block being characterized by a compound data structure. For each K blocks, a framing pattern identifying frame boundaries is added. The framing pattern may be in any suitable format.

Figure 5:
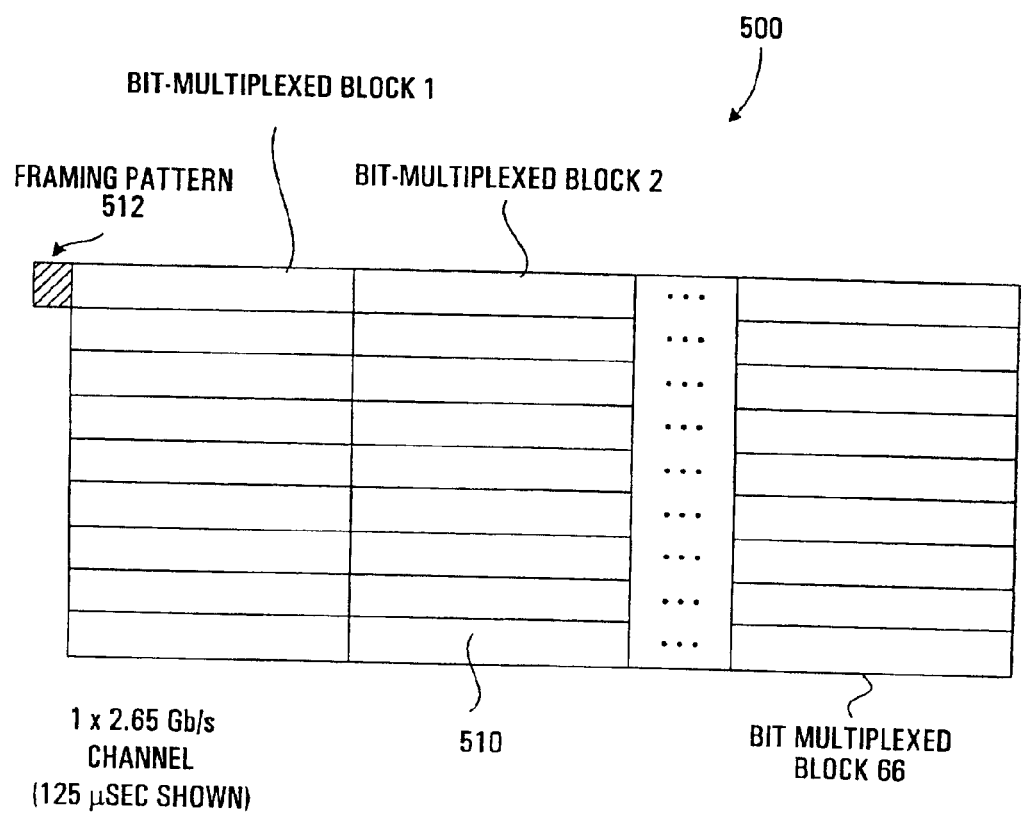
FIG. 5 depicts a signal characterized by a digital signal frame format providing forward error correction in accordance with a specific example of implementation of the invention.

FIG. 5 shows a specific example of a digital signal frame format providing forward error correction. The frame 500 includes 66 compound data structure blocks 510 and a framing pattern 512. Each block 510 in the frame 500 is characterized by a compound data structure of the type depicted in FIG. 4. At the beginning of each frame, a framing pattern is appended and is designated with reference numeral 512. It will be readily apparent that the framing pattern may alternatively be appended anywhere in the frame without detracting from the spirit of the invention. The framing pattern 512 occupies 72 bytes and is a fixed pattern used to identify frame boundaries. The frames generated by the frame generation unit are then forwarded to the transmit interface 110.

The transmit interface 110 releases a signal including a sequence of frames at the output 116 for transmission over the link between two ICs 112, each frame including a plurality of sequential blocks, each block being characterized by a compound data structure suitable for carrying payload data and overhead information. The compound data structure is derived by bit-multiplexing a set of N primary data structures, each primary data structure having a first portion and a second portion. The first portion of the primary data including payload data and the second portion including forward error correction data derived from the data elements in the first portion.

In a specific example of implementation, the signal carrying the frame 500 over link between two ICs 112 has a rate of about 2.5 Gb/s. The expression about 2.5 Gb/s may be used to include line rates in the ranges between about 2 Gb/s and about 3 Gb/s, between about 2.4 Gb/s and about 2.8 Gb/s and between about 2.5 Gb/s and about 2.7 Gb/s. In this example, each frame in the transmitted signal has a duration of about 125 $\mu$s.

Figure 6:
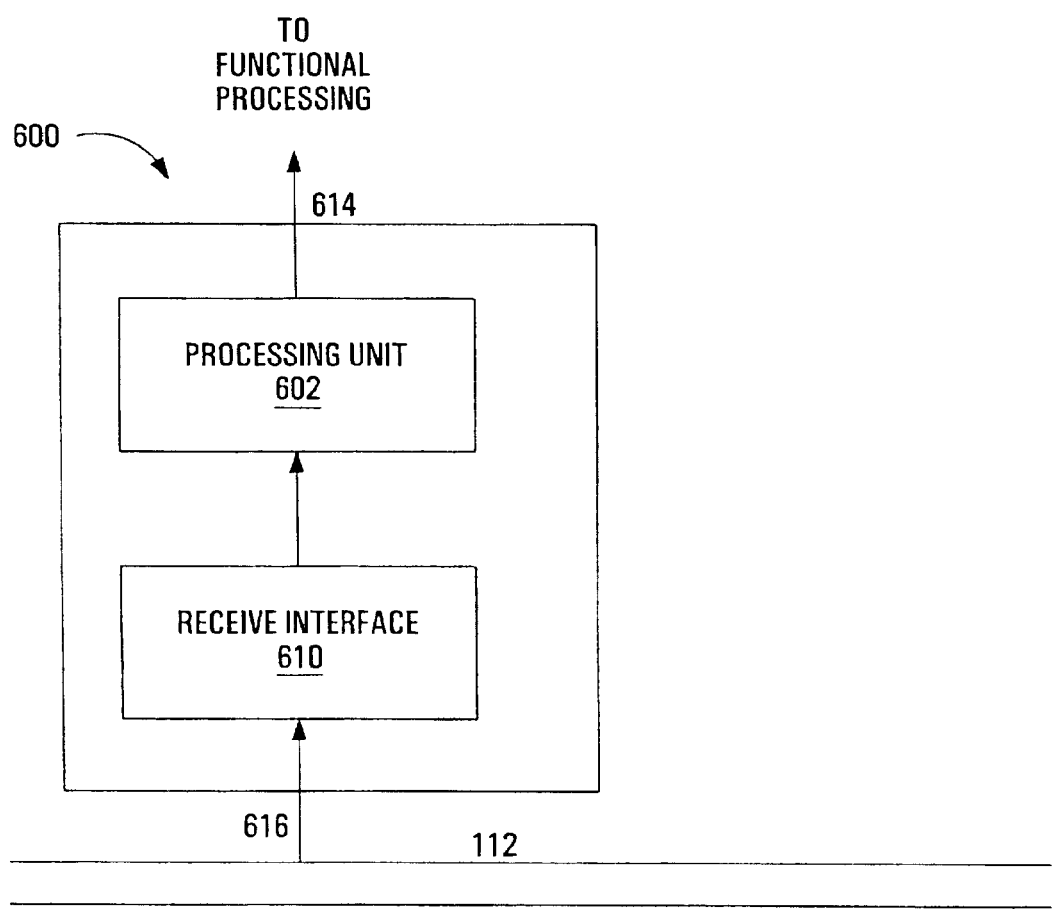
FIG. 6 is a specific example of an apparatus for extracting information from a signal constructed in accordance with a specific example of implementation of the invention.

FIG. 6 shows an apparatus 600 suitable for receiving signals from the link between two ICs 112. As depicted, the apparatus 600 comprises an input 616, an output 614, a processing unit 602, and a receive interface 610.

The receive interface 610 receives the signal originating from the link between two ICs 112 and performs any necessary processing for transmitting the output signal to the processing unit 602. The signal received has a rate of about 2.5 Gb/s and comprises a sequence of frames. The receive interface 610 performs any necessary conversions between the signal on the link between two ICs 112 and the signal to be received by the processing unit 602. In a specific implementation, the receive interface 610 applies to the signal the inverse processing operation that was applied by the transmit interface 110 of FIG. 1. In a non-limiting example, the receive interface 110 may provide amplification, equalization, decision circuitry to translate analog voltage level to binary 1 or 0 and clock recovery circuit, amongst others.

The processing unit 602 processes the signal received from the receive interface 610 to extract payload data to be transmitted to one or more functional processing units. The output 614 is for transmitting payload data extract3ed by the processing unit 602 to one or more functional processing units.

The functionality of processing unit 602 will now be described in accordance with a specific example of implementation with reference to FIG. 7 of the drawings.

Figure 7:
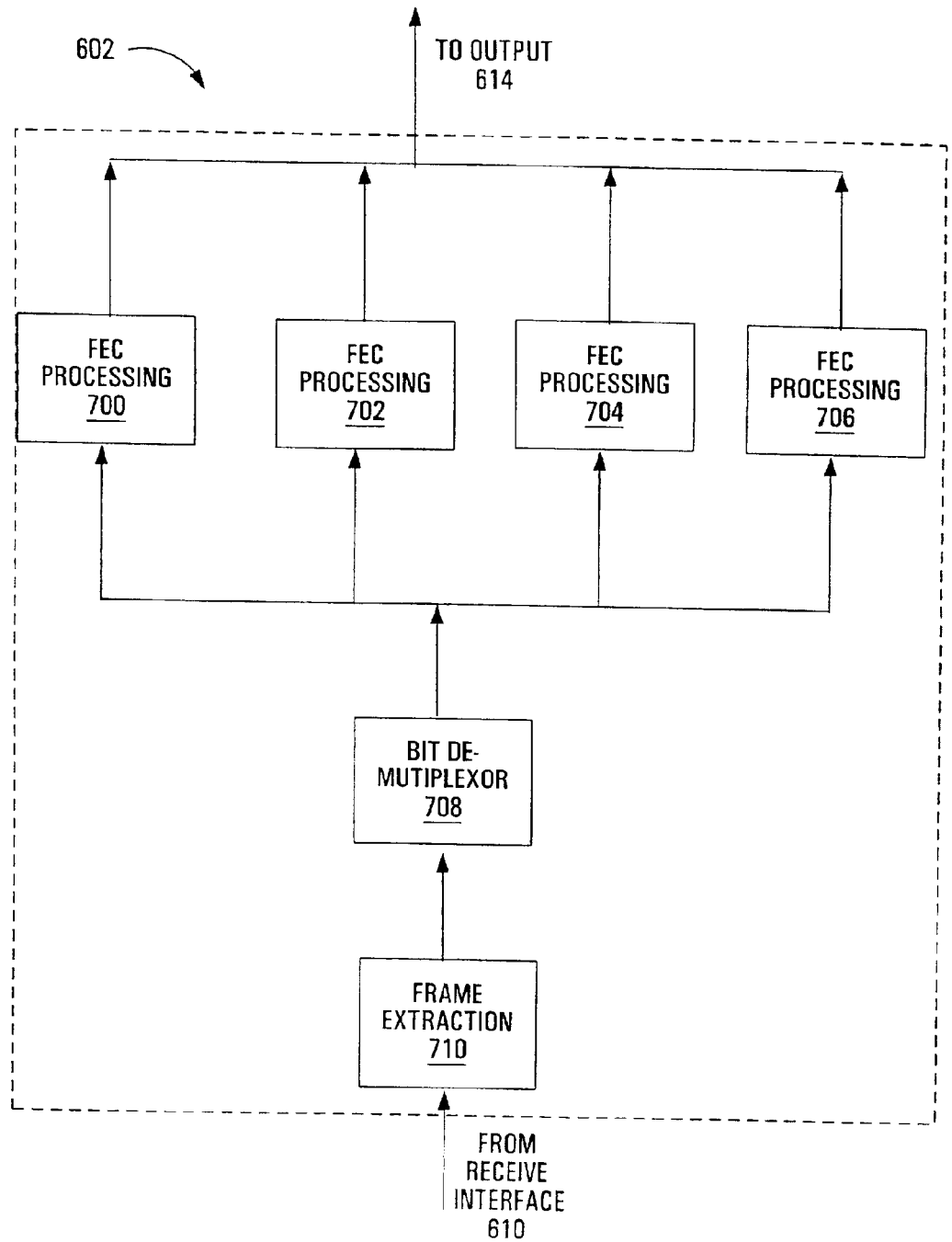
FIG. 7 is a detailed block diagram of the processing unit in the apparatus of FIG. 6.

In accordance with a specific implementation, as depicted in FIG. 7, the processing unit 602 includes a set of N forward error correction (FEC) processing units 700 702 704 706, a bit de-multiplexor unit 708 and a frame extraction unit 710.

The frame extraction unit 710 is suitable for receiving a signal including frames of the type depicted in FIG. 5. The frame extraction unit 710 locks in on the framing pattern in order to determine frame boundaries and block boundaries, each block being characterized by a compound data structure. The framing pattern is then removed from the frame and the blocks are forwarded to the bit de-multiplexor 708.

The bit de-multiplexor unit 708 applies to each compound data structure the inverse of the multiplexing operation applied by the bit multiplexor unit 208 shown in FIG. 2 in order to derive N primary data structures.

In the specific example depicted in the drawings, the compound data structure of the type shown in FIG. 4 is bit de-multiplexed into a set of N=4 primary data structures similar in format to primary data structure 300. The skilled person in the art will readily appreciate that N can take on a plurality of non-negative integer number values greater than 0. In a non-limiting example, N is selected from the set consisting of $\{1, 2, 3, \ldots, 14, 15, 16\}$. Each primary data structure comprises a first portion and a second portion, the first portion including payload data, the second portion including forward error correction data derived from the data elements in the first portion. Each of the N primary data structures is then forwarded to a respective forward error correction (FEC) processing unit. This specific example considers the case where the payload data is associated to N channels. In a variant, where the N primary data structures include data originating from a same channel, a single FEC processing unit may be used and the N primary data structures are forwarded to the same FEC processing unit.

The FEC processing units 700 702 704 706 receive respective primary data structures. Each FEC processing unit decodes the FEC portion of the primary data structure and effects any required correction to the payload data portion. The specific FEC decoding function applied by the FEC processing units is dependent upon the FEC coding used by FEC calculator units 200 202 204 and 206. Advantageously, the use of FEC over a link between two ICs allows a reduction in the bit error rate (BER) when transmitting a signal over a backplane or between two ICS on a same circuit pack. The FEC processing units 700 702 704 706 then release a signal including payload data to output 614. The skilled person in the art will readily appreciate that different types of payload data may be released at output 614 without detracting from the spirit of the invention.

Figure 8:
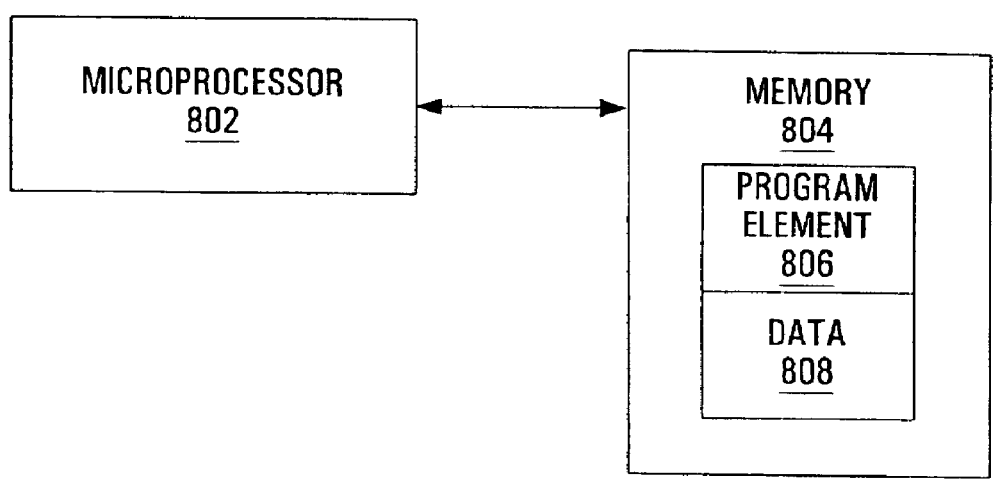
FIG. 8 is a block diagram of a specific example of implementation of the apparatuses of FIGS. 1 and 6.

The above-described apparatuses 100 600 for generating and receiving a signal of the type described in connection with FIG. 5 can be implemented on devices including a microprocessor 802 and a memory 803 as shown in FIG. 8. The microprocessor 802 is adapted to execute a program element 806 in order to implement the functional blocks described in the specification and depicted in the drawings. Alternatively, the above-described apparatuses 100 600 can be implemented on a dedicated hardware platform where electrical/electronic components implement the functional blocks described in the specification and depicted in the drawings.

The apparatuses 100 may form part of an integrated circuit embedded in a dedicated chip or may form part of an IC.

It is to be appreciated that although the reception and transmission capabilities have been described with reference to FIGS. 1 and 6 as implemented by separate apparatuses, it will be readily apparent that a same apparatus including both transmission and reception capability falls within the scope of the invention.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. An apparatus suitable for transmitting a signal between two ICs, said apparatus comprising:
   a) an input for receiving an input signal comprising payload data to be transmitted between the two ICs;
   b) a first processing unit coupled to said input, said first processing unit being operative for:
      i) processing the payload data in the input signal to derive forward error correction data at least in part on the basis of the payload data in the input signal;
      ii) generating a coded signal comprising the payload data received in the input signal and the forward error correction data generated in i);
   c) a transmission link for transmitting the coded signal between the two ICs;
   d) a second processing unit interfacing with said transmission link, said second processing unit being operative for processing the code signal by extracting the payload data from the coded signal;
   e) an output releasing the payload data extracted by said second processing unit.

2. An apparatus as defined in claim 1, wherein said transmission link includes a backplane portion.

3. An apparatus as defined in claim 1, wherein said first processing unit is operative to apply BCH-1 coding on the payload data to derive the forward error correction data.

4. An apparatus as defined in claim 1, said first processing unit being further operative for:
   a) processing the input signal to generate N primary data structures, each primary data structure comprising a first portion and a second portion, the first portion including payload data and the second portion including forward error correction data derived from the payload data in the first portion of the primary data structure;
   b) bit-multiplexing the N primary data structures generated in a) to derive a compound data structure;
   c) generating a frame at least in part by grouping a plurality of compound data structures generated in b);
   d) generating the coded signal at least in part on the basis of the frame generated in c).

5. An apparatus as defined in claim 4, wherein each frame includes 66 sequential blocks and a framing pattern.

6. An apparatus as defined in claim 5, wherein each primary data structure includes about 1176 bits.

7. An apparatus as defined in claim 6, wherein at least part of the first 1164 bits of each primary data structure includes payload data, and 12 bits include forward error correction data.

8. An apparatus as defined in claim 4, wherein the forward error correction data in a given primary data structure are derived by applying BCH-1 coding on at least part of the payload data of the given primary data structure.

9. An apparatus as defined in claim 1, wherein said transmission link is between two ICs on a same circuit pack.

10. An apparatus as defined in claim 4, wherein N is about 4.

11. An apparatus as defined in claim 1, wherein the coded signal has a rate of about 2.5 Gb/s.

12. An apparatus suitable for transmitting a signal between two ICs, said apparatus comprising:
   a) an input for receiving an input signal comprising data to be transmitted between the two ICs;
   b) a first processing unit coupled to said input for processing the input signal to generate a coded signal in which the data is organized into a sequence of frames, each frame including a plurality of sequential blocks, each block being characterized by a compound data structure suitable for carrying payload data and overhead information, said compound data structure being derived by bit-multiplexing a set of N primary data structures, each primary data structure comprising a first portion and a second portion, the first portion including payload data, the second portion including forward error correction data derived from the data elements in the first portion;
   c) a transmission link for transmitting the coded signal between the two ICs;
   d) a second processing unit interfacing with said transmission link, said second processing unit being operative for processing the coded signal by extracting the payload data from the coded signal;
   e) an output for releasing the payload data extracted by said second processing unit.

13. A method for transmitting a signal between two ICs, said method comprising:
   a) receiving an input signal comprising payload data to be transmitted between the two ICs;
   b) processing the payload data in the input signal to derive forward error correction data at least on part on the basis of the payload data in the input signal;
   c) generating a coded signal comprising the payload data received in the input signal and the forward error correction data;
   d) transmitting the coded signal between the two ICs on a transmission link:
   e) interfacing with the transmission link in order to process the coded signal by extracting the payload data from the coded signal;
   f) releasing the payload data extracted from the coded signal.

14. A method as defined in claim 13, wherein said transmission link includes a backplane portion.

15. A method as defined in claim 13, wherein forward error correction data is derived at least in part by applying BCH-1 coding on the payload data.

16. A method as defined in claim 13, said method further comprising:
   a) processing the input signal to generate N primary data structures, each primary data structure comprising a first portion and a second portion, the first portion including payload data, the second portion including forward error correction data derived from the payload data in the first portion of the primary data structure;
   b) bit-multiplexing the N primary data structures to derive a compound data structure, the compound data structure being suitable for carrying payload data and overhead information;
   c) generating a frame at least in part by grouping a plurality of compound data structures;
   d) generating the coded signal at least in part on the basis of the frame generated in c).

17. A method for transmitting a signal between two ICs, said method comprising:
   a) receiving an input signal comprising data to be transmitted between the two ICs;
   b) processing the input signal to generate a coded signal in which the data is organized into a sequence of frames, each frame including a plurality of sequential blocks, each block being characterized by a compound data structure suitable for carrying payload data and overhead information, said compound data structure being derived by bit-multiplexing a set of N primary data structures, each primary data structure comprising a first portion and a second portion, the first portion including payload data, the second portion including forward error correction data derived from the data elements in the first portion;

c) transmitting the coded signal between two ICs on a transmission link;

d) interfacing with the transmission link in order to process the coded signal by extracting the payload data from the coded signal;

e) releasing the payload data extracted from the coded signal.

* * * * *

UNITED STATES PATENT AND TRADEMARK OFFICE
CERTIFICATE OF CORRECTION

PATENT NO.   : 6,907,560 B2                                                   Page 1 of 1
DATED        : June 14, 2005
INVENTOR(S)  : Ronald J. Gagnon It is certified that error appears in the above-identified patent and that said Letters Patent is hereby corrected as shown below:

Column 5,
Line 55, delete "payload data extract3ed by" and insert therefor -- payload data extracted by --;

Column 7,
Line 22, delete "…for processing the code signal by extracting…", and insert therefor, -- …for processing the coded signal by extracting… --;
Line 24, delete "an output releasing…", and insert therefor -- an output for releasing… --; and
Line 60, delete "An apparatus as defined in claim 4, wherein N is about 4." and insert therefor -- An apparatus as defined in claim 7, wherein N is 4. --.

Signed and Sealed this

Thirteenth Day of December, 2005

JON W. DUDAS
*Director of the United States Patent and Trademark Office*